US006472644B1

(12) United States Patent
Wu

(10) Patent No.: US 6,472,644 B1
(45) Date of Patent: Oct. 29, 2002

(54) GRILL DEVICE WITH A SAFETY UNIT FOR ENSURING ELECTRICAL DISCONNECTION WHEN TWO GRILL UNITS ARE SEPARATED

(75) Inventor: Tsan-Kuen Wu, Tainan Hsien (TW)

(73) Assignee: Tsann Kuen USA Inc., CA (US)

( * ) Notice: Subject to any disclaimer, the term of this patent is extended or adjusted under 35 U.S.C. 154(b) by 0 days.

(21) Appl. No.: 09/969,112

(22) Filed: Oct. 1, 2001

(51) Int. Cl.[7] .............................. H05B 3/68; H05B 3/08; H01R 13/44
(52) U.S. Cl. ...................... 219/450.1; 219/541; 439/135
(58) Field of Search .......................... 219/450.1, 459.1, 219/541; 99/378, 379; 439/135, 136

(56) References Cited

U.S. PATENT DOCUMENTS 5,524,528 A * 6/1996 Yeh ........................ 219/459.1
5,546,851 A * 8/1996 Goto ........................... 99/446
6,252,204 B1 * 6/2001 Po-Hei .................... 219/450.1
6,262,399 B1 * 7/2001 Lau et al. ................ 219/450.1

* cited by examiner

Primary Examiner—Sang Paik
(74) Attorney, Agent, or Firm—Ostrolenk, Faber, Gerb & Soffen

(57) ABSTRACT

A grill device includes a horizontal upper grill which is superposed on a lower grill unit and which has an upper cooking member and an insulated terminal-mounting seat. The terminal-mounting seat has first and second terminals electrically coupled with the upper cooking member and a ground terminal hole. A spring-biased blocking plate is mounted on the terminal-mounting seat in such a manner to deny access into the ground terminal hole in the terminal-mounting seat when the upper grill unit is separated from the lower grill unit. A push plate with a through hole is fixed on the lower grill unit, and pushes the blocking plate away from the ground terminal hole when the upper grill unit is superposed on the lower grill unit, thereby establishing spatial communication between the through hole in the push plate and the ground terminal hole in the terminal-mounting seat.

3 Claims, 5 Drawing Sheets

GRILL DEVICE WITH A SAFETY UNIT FOR ENSURING ELECTRICAL DISCONNECTION WHEN TWO GRILL UNITS ARE SEPARATED

BACKGROUND OF THE INVENTION

1. Field of the Invention

The invention relates to a grill device, more particularly to a grill device with a safety unit for ensuring electrical disconnection when two grill units are separated from each other.

2. Description of the Related Art

In order to facilitate cleaning and washing thereof, a conventional grill device is constructed into two separate grill units which are superposed on each other in use. However, the cooking members of the grill units can be undesirably activated when the grill units are separated from each other, thereby exposing a nearby person or user to danger.

SUMMARY OF THE INVENTION

The object of this invention is to provide a grill device with a safety unit which can eliminate the occurrence of the aforesaid disadvantages of the conventional grill device.

Accordingly, a grill device of the present invention includes a horizontal upper grill unit with a left side, a horizontal lower grill unit, and a safety unit. The upper grill unit is superposed on the lower grill unit so as to dispose the upper grill unit at a closed position relative to the lower grill unit, and has a left side and a bottom that is provided with an upper cooking member. The upper grill unit includes an insulated terminal-mounting seat which is fixed on the left side and which has a left side face, a ground terminal hole extending inwardly relative to the terminal-mounting seat from the left side face, first and second terminals which are fixed on and which extend outwardly and in parallel from the left side face of the terminal-mounting seat and which are electrically coupled with the upper cooking member. The safety unit includes a spring-biased blocking plate which is mounted on the left side face of the terminal-mounting seat and which spans the ground terminal hole in the terminal-mounting seat to deny access into the ground terminal hole when the upper grill unit is moved away from the lower grill unit, and a push plate with a through hole which is fixed on the left side of the lower grill unit and which pushes the blocking plate away from the ground terminal hole when the upper grill unit is disposed at the closed position, thereby establishing spatial communication between the through hole in the push plate and the ground terminal hole in the terminal-mounting seat.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
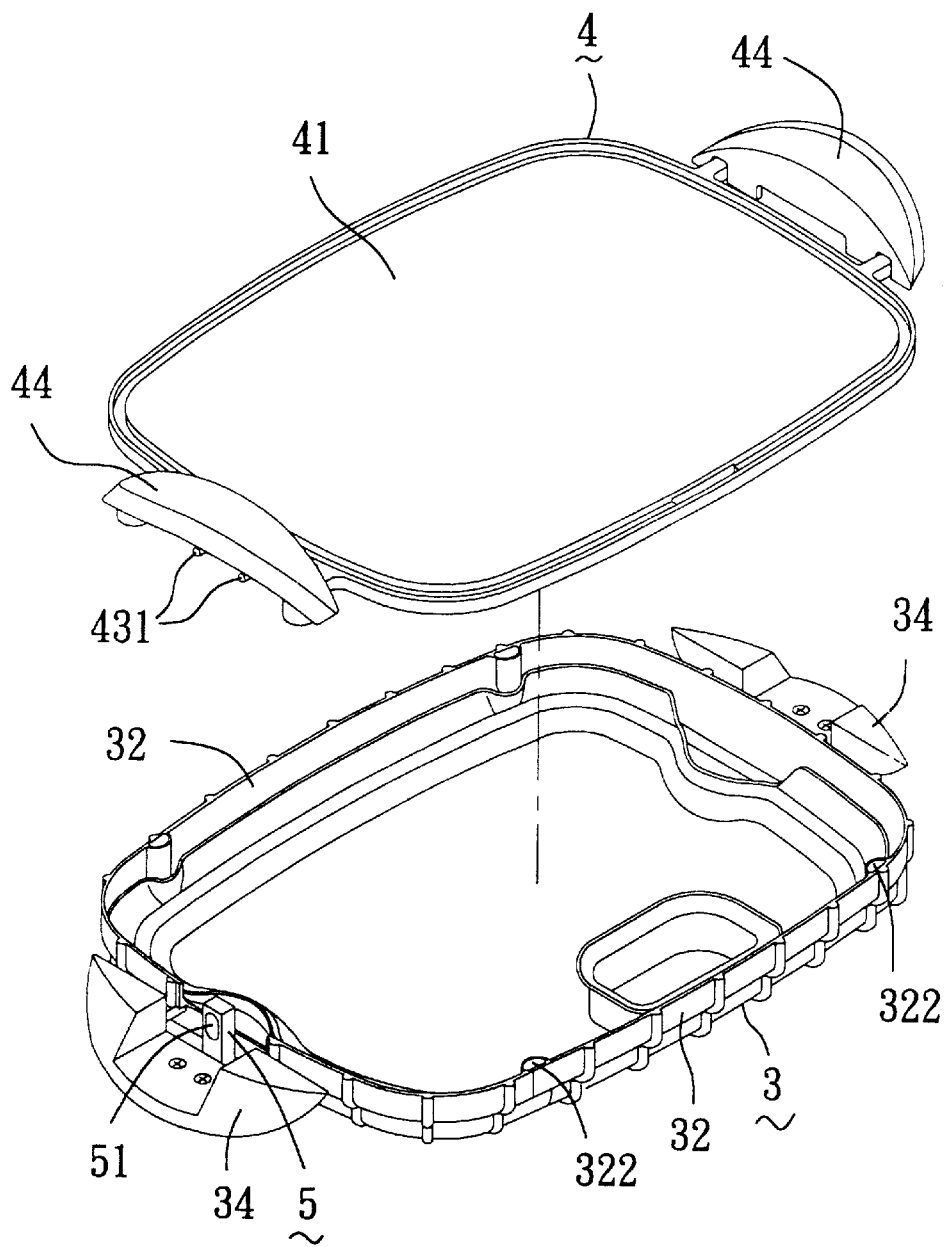
FIG. 1 is a partly exploded, perspective view of the preferred embodiment of a grill device according to the present invention.
Figure 2:
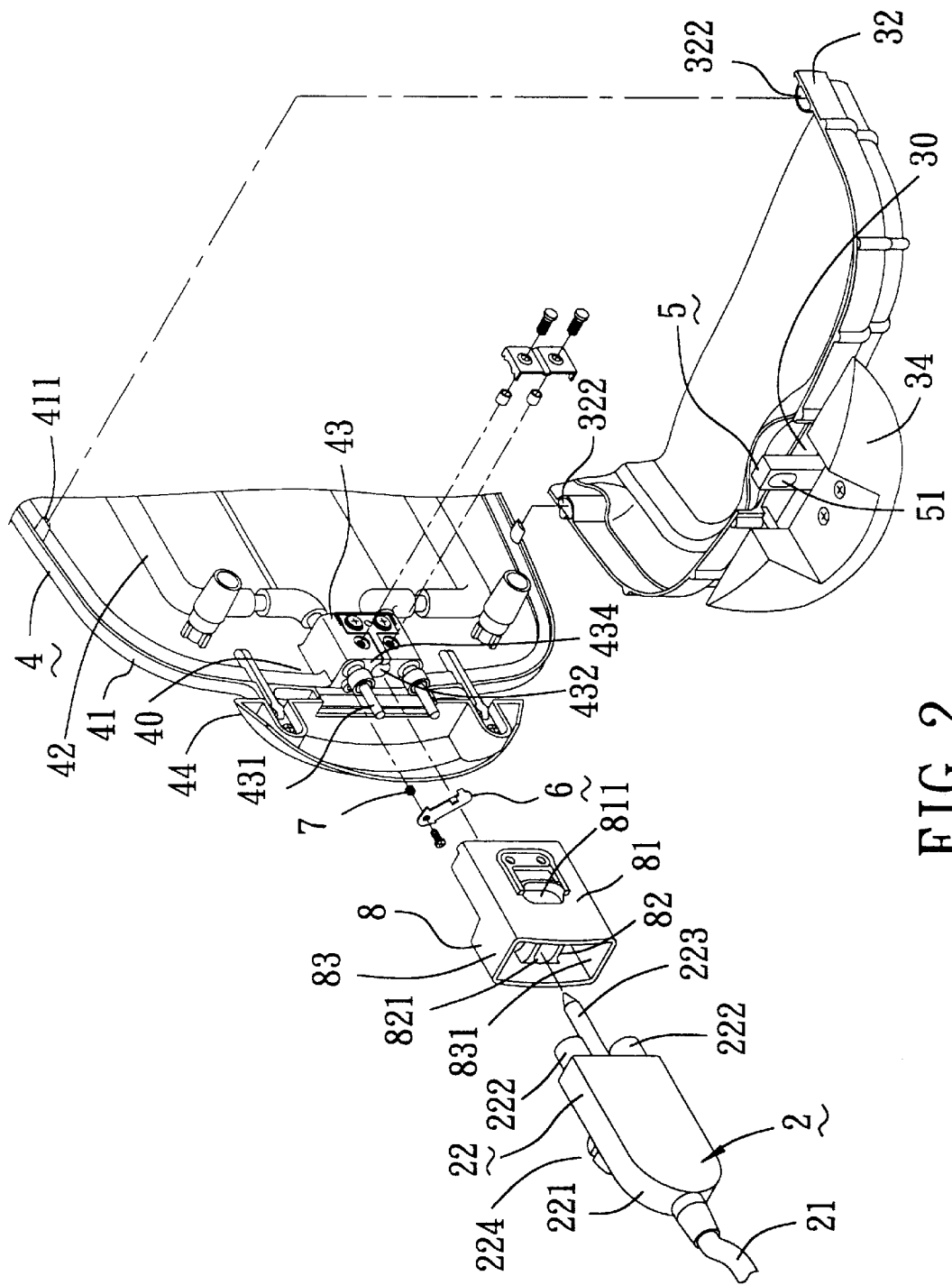
FIG. 2 is a fragmentary partly exploded, perspective view of the preferred embodiment, wherein an upper grill unit is tilted to illustrate mounting of a cooking member thereto.
Figure 3:
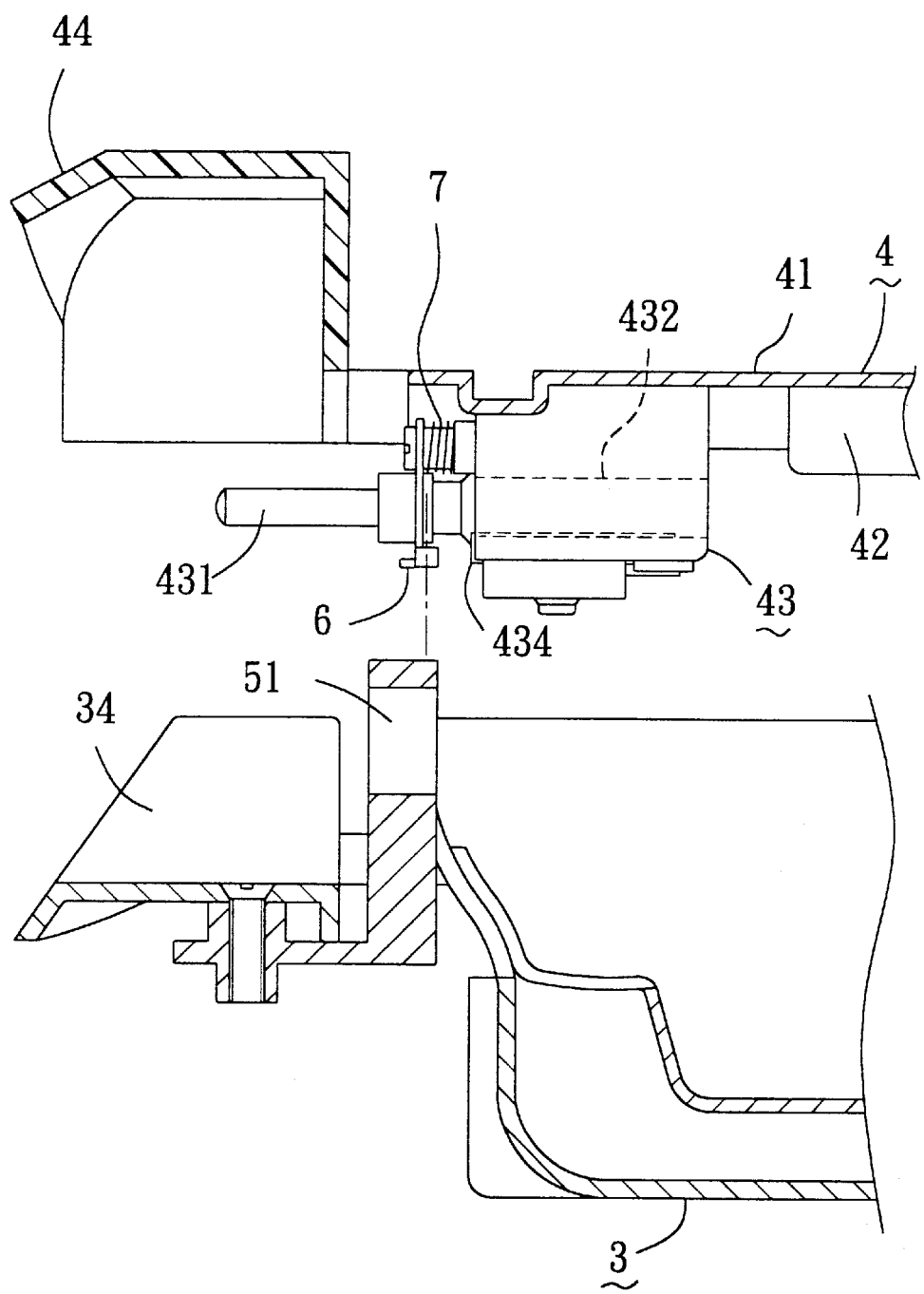
FIG. 3 is a fragmentary, partly exploded side view of the preferred embodiment, wherein a terminal-protective casing is removed from the upper grill unit to illustrate mounting of a spring-biased blocking plate thereto.

Referring to FIGS. 1 to 3, the preferred embodiment of a grill device of this invention is shown to include a horizontal upper grill unit 4 with a left side 40, a horizontal lower grill unit 3 with a left side 30, and a safety unit.

Figure 5:
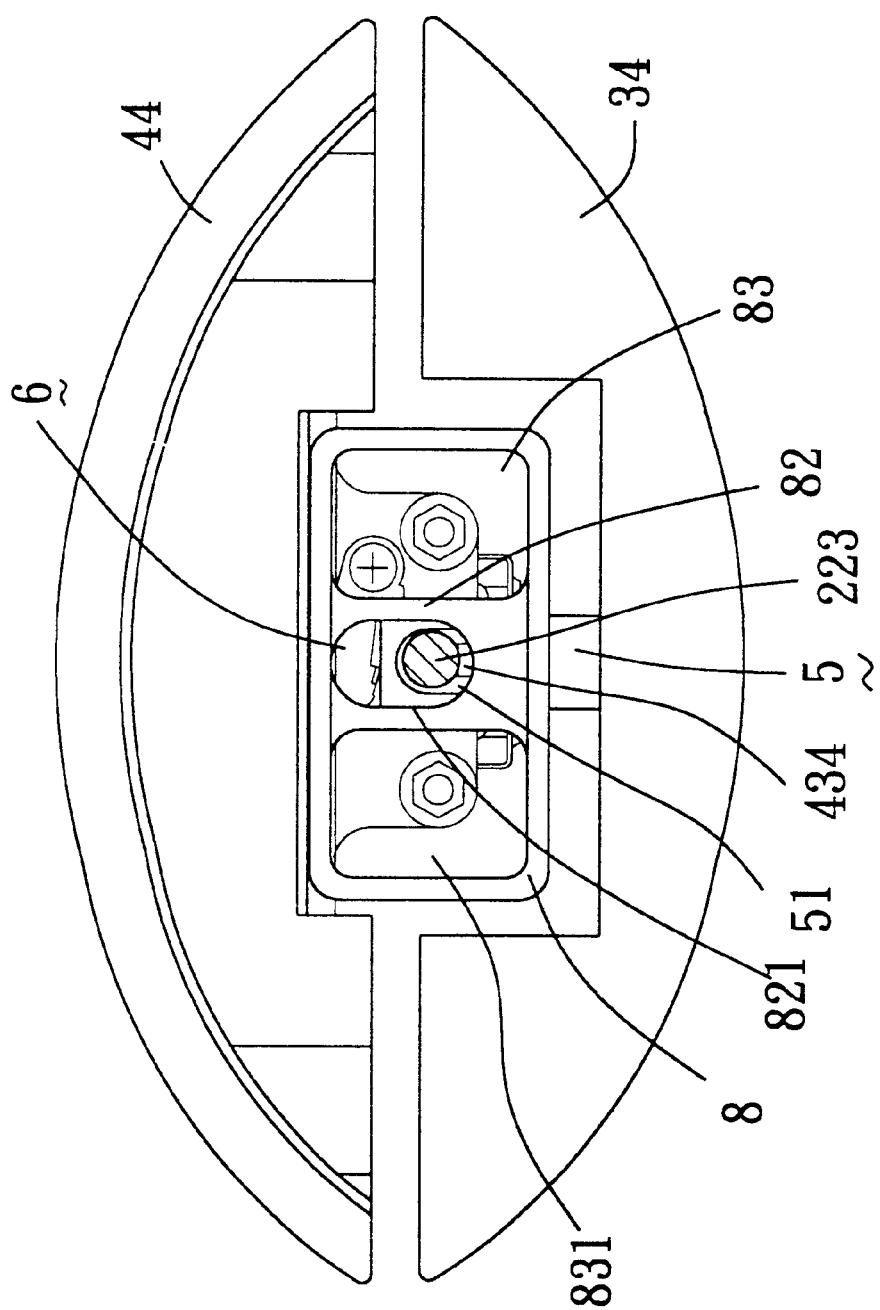
FIG. 5 is a lateral side view of the preferred embodiment when the upper grill unit is superposed on the lower grill unit.

The upper grill unit 4 is superposed on the lower grill unit 3 so as to dispose the same at a closed position relative to the lower grill unit 3 (see FIG. 5), and has a bottom 41 that is provided with an upper cooking member 42. The upper and lower grill units 4,3 are provided with left and right handgrips 44,34 to facilitate handling thereof.

The upper grill unit 4 includes an insulated terminal-mounting seat 43 which is fixed on the left side 40 and which has a left side face 434, a ground terminal hole 432 which extends inwardly from the left side face 434 relative to the terminal-mounting seat 43, first and second terminals 431 which are fixed on and which extend outwardly and in parallel from the left side face 434 of the terminal-mounting seat 43 and which are electrically coupled with the upper cooking member 42, and an insulated terminal protective casing 8 which is fixed on the left side 40 around the terminal-mounting seat 43 and which define two parallel passages 831 to permit extension of the first and second terminals 431 therein and a transit hole 821 between the passages 831 and in lateral registry with the ground terminal hole 432.

Figure 4:
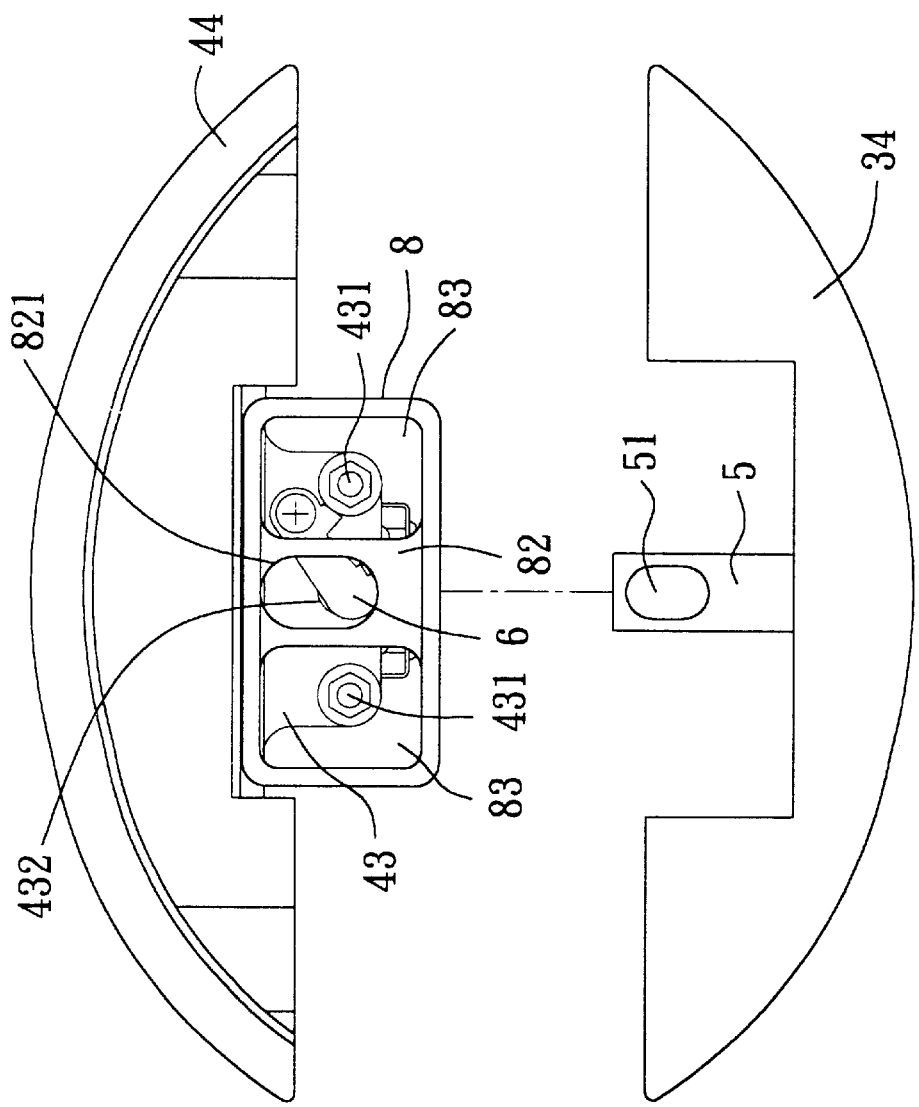
FIG. 4 is a partly exploded, lateral side view of the preferred embodiment, illustrating how electrical disconnection of the cooking member of the upper grill unit is ensured when the upper grill unit is removed from a lower grill unit.

The safety unit includes a spring-biased blocking plate 6 which is disposed within the terminal-protective casing 8 and which is mounted on left side face 434 of the terminal-mounting seat 43 so as to span the transit hole 821 in the terminal-protective casing 8 and the ground terminal hole 432 in the terminal-mounting seat 43 when the upper grill unit 4 is moved away from the lower grill unit 3, as best shown in FIG. 4. Under this condition, spatial communication between the transit hole 821 and the ground terminal hole 432 is blocked. The safety unit further includes a push plate 5 which is fixed on the left side 30 of the lower grill unit 3 and which extends transversely into the transit hole 821 in the terminal-protective casing 8 to push the blocking plate 6 away from the transit hole 821 when the upper grill unit 4 is disposed at the closed position, thereby establishing spatial communication between the transit hole 821 and the ground terminal hole 432.

Preferably, the push plate 5 is formed with a through hole 51 that is registered with the transit hole 821 in the terminal-protective casing 8 and the ground terminal hole 432 in the terminal-mounting seat 43 when the upper grill unit 4 is disposed at the closed position. The terminal-protective casing 8 has a bottom wall 81 formed with a plate passage 811 that is in spatial communication with the transit hole 821 in such a manner that the push plate 5 extends into the transit hole 821 via the plate passage 811 when the upper grill unit 4 is at the closed position. The terminal-protective casing 8 further has two side walls 83 and two intermediate walls 82 which are disposed between and which extend parallel to the side walls 83 to define the transit hole 821 and the parallel passages 831 at two sides of the transit hole 821 to receive the first and second terminals 431, respectively.

The upper grill unit 4 has a peripheral wall 41 provided with a plurality of retention studs 411 which are received in positioning grooves 322 that are formed in a top surface of a peripheral flange 32 of the lower grill unit 3 when the upper grill unit 4 is superposed on the lower grill unit 3.

Referring once again to FIG. 2, a connecting cable 2 is provided and has a first end 21 adapted to be connected electrically to a power source (not shown) and a second end 22 in the form of a plug. The plug 22 includes an insulated plug body 221, two hollow conductors 222 which are fixed on and which extend outwardly from the plug body 221, and a ground terminal 223 which is disposed between the hollow conductors 222 and which extends outwardly from the plug body 221. In use, the plug 22 is inserted into the terminal-protective casing 8, the ground terminal 223 is received in the ground terminal hole 432 of the terminal-mounting seat 43 via the through hole 51 in the push plate 5, and the first and second terminals 431 are received in the hollow conductors 222. Under this condition, the upper grill unit 4 is prevented from being removed from the lower grill unit 3. A temperature control unit 224 is mounted on the plug body 221 and is electrically connected to the cooking member 42 so as to control the required cooking temperature in a conventional manner. The ground terminal 223 is preferably connected to a temperature sensing circuit (not shown) that is fixed in the plug body 221 and is electrically connected to the control unit 224.

With this invention thus explained, it is apparent that numerous modifications and variations can be made without departing from the scope and spirit of this invention. It is therefore intended that this invention be limited only as indicated in the appended claims.

I claim:

1. A grill device comprising:

a horizontal lower grill unit having a left side;

a horizontal upper grill unit superposed on said lower grill unit to form a closed position with said lower grill unit, and having a first side and a bottom surface;

a cooking member on said bottom surface of said upper grill unit;

an insulated terminal-mounting seat on said left side and having a left side face;

a ground terminal hole extending inwardly relative to said terminal-mounting seat from said left side face;

first and second terminals extending outwardly and in parallel from said left side face of said terminal-mounting seat and being electrically coupled with said cooking member;

a spring-biased blocking plate mounted on said left side face of said terminal-mounting seat and covering a portion of said ground terminal hole in said terminal-mounting seat to block access to said ground terminal hole when said upper grill unit is moved away from said lower grill unit; and a push plate with a through hole on said left side of said lower grill unit to push said blocking plate away from said ground terminal hole in said terminal-mounting seat when said upper grill unit is disposed at said closed position, thereby establishing spatial communication between said through hole in said push plate and said ground terminal hole in said terminal-mounting seat.

2. The grill device as defined in claim 1, wherein said upper grill unit further includes an insulated terminal-protective casing on said left side around said terminal-mounting seat and which defines two parallel passages to permit extension of said first and second terminals therein and a transit hole between said parallel passages and in lateral registry with said ground terminal hole in said terminal-mounting seat, said spring-biased blocking plate preventing spatial communication between said ground terminal hole in said terminal-mounting seat and said transit hole in said terminal-protective casing when said upper grill unit is moved away from said lower grill unit.

3. The grill device as defined in claim 2, wherein said terminal-protective casing has a plate passage in spatial communication with said transit hole, said push plate extending into said transit hole via said plate passage to push said blocking plate away from said ground terminal hole when said upper grill unit is at said closed position.

* * * * *